United States Patent
Papp

(10) Patent No.: US 7,918,650 B2
(45) Date of Patent: Apr. 5, 2011

(54) SYSTEM FOR PRESSURIZING FLUID

(76) Inventor: Eugene Papp, East Windsor, NJ (US)

( * ) Notice: Subject to any disclaimer, the term of this patent is extended or adjusted under 35 U.S.C. 154(b) by 762 days.

(21) Appl. No.: 11/627,770

(22) Filed: Jan. 26, 2007

(65) Prior Publication Data
US 2008/0181771 A1 Jul. 31, 2008

(51) Int. Cl.
*F03D 3/00* (2006.01)
(52) U.S. Cl. .................. 416/197 A; 415/909; 415/905; 415/4.1
(58) Field of Classification Search .......... 415/905, 415/907, 908, 909; 416/197 A, 197 R, 197 B
See application file for complete search history.

(56) References Cited

U.S. PATENT DOCUMENTS

| | | | | |
|---|---|---|---|---|
| 273,920 A * | 3/1883 | Walker | | 415/220 |
| 1,599,944 A * | 9/1926 | Baumgart | | 415/46 |
| 1,600,105 A | 9/1926 | Fonkiewicz | | |
| 3,302,552 A * | 2/1967 | Walsh | | 454/22 |
| 3,894,393 A | 7/1975 | Carlson | | |
| 3,936,652 A | 2/1976 | Levine | | |
| 4,016,725 A | 4/1977 | Fiss | | |
| 4,229,661 A * | 10/1980 | Mead et al. | | 290/44 |
| 4,275,309 A * | 6/1981 | Lucier | | 290/1 R |
| 4,508,973 A | 4/1985 | Payne | | |
| 5,163,813 A * | 11/1992 | Schlenker | | 415/4.2 |
| 5,483,798 A | 1/1996 | Prueitt | | |
| 6,590,300 B1 | 7/2003 | Preito Santiago | | |
| 6,717,285 B2 | 4/2004 | Ferraro | | |
| 6,827,555 B2 * | 12/2004 | Yang | | 416/197 R |
| 6,945,747 B1 * | 9/2005 | Miller | | 415/4.3 |
| 6,997,674 B1 * | 2/2006 | Johnson | | 415/80 |
| 2007/0020097 A1 * | 1/2007 | Ursua | | 415/213.1 |

FOREIGN PATENT DOCUMENTS

| | | |
|---|---|---|
| GB | 340.127 | 12/1930 |
| GB | 524.680 | 8/1940 |
| WO | WO01/96740 | 12/2001 |
| WO | WO2006/018587 | 2/2006 |

* cited by examiner

*Primary Examiner* — Edward Look
*Assistant Examiner* — Ryan H Ellis
(74) *Attorney, Agent, or Firm* — Michael I. Kroll

(57) ABSTRACT

A system for providing low cost fluid pressurization without consumption of limited natural resources, pollution, or greenhouse gas emission, and is independent of wind conditions. Additionally, the system of the present invention includes a venturi-like collar positioned at the top of one or more stacks increasing air flow.

11 Claims, 8 Drawing Sheets

SYSTEM FOR PRESSURIZING FLUID

BACKGROUND OF THE INVENTION

1. Field of the Invention

The present invention relates generally to power generation and, more specifically, to a system for generating electricity utilizing continuous reusable energy.

The energy generating system of the present invention produces low cost electric power without consumption of limited natural resources, pollution, or greenhouse gas emission, and is independent of wind conditions. In turn, the energy generating system of the present invention provides improved means over existing coal and gas fixed power generation as well as nuclear plants and wind mill farms.

The present invention is a system for generating electricity comprising a plurality of towers in communication with a base level conduit housing having a section of smaller diameter containing an air driven turbine connected to a power storage system used to power a generator.

The towers are unified at the lower end with a single base enclosure providing means to maximize air speed. The venturi throat with the undershot air wheel is affixed within the single base enclosure. The upper end of each tower can include a venturi like collar to increase air suction.

An air compressor or pump is connected to the shaft of the aforementioned under shot air wheel by means of belt and/or gear system. The compressed air is then transferred to a storage tank suitable for high pressure. A plurality of air compressors and/or storage tanks may be utilized to suit power requirements to run the generator. Additionally, a fluid pump(s) may be utilized in lieu of the air compressor(s).

The compressed air is released and transferred to the generators whirling wheel providing necessary mechanical energy to turn the generator rotor and in turn, means to convert the mechanical energy into electrical energy. Pressure valves and an automatic controller provide means to regulate air flow between the store tanks and to the generator.

2. Description of the Prior Art

There are other energy generating systems. Typical of these is U.S. Pat. No. 1,600,105 issued to Fonkiewicz on Jul. 12, 1923.

Another patent was issued to Carlson on Jul. 15, 1975 as U.S. Pat. No. 3,894,393. Yet another U.S. Pat. No. 3,936,652 was issued to Levine on Feb. 3, 1976 and still yet another was issued on Apr. 12, 1977 to Fiss as U.S. Pat. No. 4,016,725.

Another patent was issued to Payne on Apr. 2, 1985 as U.S. Pat. No. 4,508,973. Yet another U.S. Pat. No. 5,483,798 was issued to Prueitt on Jan. 16, 1996. Another was issued to Preito Santiago on Jul. 8, 2003 as U.S. Pat. No. 6,590,300 and still yet another was issued on Apr. 6, 2004 to Ferraro as U.S. Pat. No. 6,717,285.

Internationally, a patent was issued to Branczik on Dec. 24, 1930 as U.K. Patent No. GB340,127. Yet another U.K. Patent No. GB524680 was issued to Honig on Aug. 13, 1940. An International Patent Application was issued to Drucker on Dec. 20, 2001 as WO01/96740. Another International Patent Application was issued to Coustou on Feb. 23, 2006 as WO2006/018587.

U.S. Pat. No. 1,600,105

Inventor: Joseph Fonkiewicz

Issued: Sep. 14, 1926

This invention relates to new and useful improvements in power generators of the air propelled turbine type. An important object of this invention is, to provide means for making use of the old, well established principle of the upward draft of heated air through a hot stack, for the purpose of generating power. A further object of the invention is to provide a novel form of turbine wheel and draft with suitable anti-friction supporting means for the same. A still further object of the invention is to provide suitable means for relieving the weight of the turbine wheel and shaft from their supporting means when repairs to the latter are necessary.

U.S. Pat. No. 3,894,393

Inventor: Phillip R. Carlson

Issued: Jul. 15, 1975

A method and means for the generation of power from a controlled air flow, wherein an enclosed air mass is cooled at high altitude below the temperature of the surrounding air. The air is isolated from the surrounding air by means of a large duct. The resulting cooler, denser air flows down the duct toward lower altitude, and the energy of the falling air mass is extracted by means of a turbine generator.

U.S. Pat. No. 3,936,652

Inventor: Steven K. Levine

Issued: Feb. 3, 1976

A heat source heats air which rises in a duct having at least a one hundred meter vertical rise. Cold air enters the bottom of the duct through one or more horizontal passages containing vanes driven by moving air as a power source. The heat source may be a heat exchanger connected to an atomic reactor, a fossil fuel plant, a solar collector, or a geothermal heat supply. The heat exchanger may be located in the duct or in the one or more horizontal passages. In some applications, solar energy may directly heat the duct or a grid therein to cause an air flow.

U.S. Pat. No. 4,016,725

Inventor: Edward C. Fiss

Issued: Apr. 12, 1977

In a thermoelectric generating plant utilizing heat to generate electric energy and having a recirculating water system in which the water is heated during passage through the plant and must be cooled before recirculation to the plant thus causing a heat loss and resultant loss of energy; the combination therein of apparatus for recapturing a portion of the normally lost energy. The apparatus includes a natural air draft, cooling tower for the flow of air from the bottom to the top thereof and disposed in the recirculating water system for receiving the heated water and passing the heated water through the flow of air at generally the bottom thereof for cooling the heated water and heating the air to cause a natural draft flow of air up through the tower. A rotor is positioned within the cooling tower for being rotated by the natural draft flow of air therethrough and an electric generator is driven by the rotor to generate electric energy and thus recapture a portion of the normally lost energy from the plant.

U.S. Pat. No. 4,508,973

Inventor: James M. Payne

Issued: Apr. 2, 1985

A wind-operated electric generator system of simple design including a stationary circular arrangement of segmental wind inlet passages extending around a vertical axis and having vertical inlet openings at the outer ends, the inlet openings having inwardly and upwardly curving walls extending from the inlet openings toward the central axis, the lower walls sloping upwardly an appreciably greater extent than the upper walls to form an inwardly and upwardly extending convergence with the inner portions of the upper walls to form constricted upwardly directed exit passages that merge into a Venturi throat in which a bladed impeller is mounted upon a vertical shaft which is connected to an electric generator, and the sides of the segmental inlet passages also converging toward the central axis and cooperating with the converging upper and lower walls to form an efficient Venturi effect to increase the speed of air currents directed to the impeller.

U.S. Pat. No. 5,483,798

Inventor: Kurt P. Prueitt

Issued: Jan. 16, 1996

Convection towers which are capable of cleaning the pollution from large quantities of air, of generating electricity, and of producing fresh water utilize the evaporation of water sprayed into the towers to create strong airflows and to remove pollution from the air. Turbines in tunnels at the skirt section of the towers generate electricity, and condensers produce fresh water.

U.S. Pat. No. 6,590,300

Inventor: Preito Santiago

Issued: Jul. 8, 2003

A cyclonic or anti-cyclonic conversion tower which consists of a central vortical duct, and at least one convector made up of two vertical membranes or screens and, generated by a curve and which are limited at one of their sides by the central vortical duct, and at least tow stiffeners and per convector, there being a blocking device per convector, a diffuser, a deflector, and means for converting kinetic energy into electrical or mechanical energy, the blocking devices having the shape of a guiding crown and can turn on the outer circumference of the central vortical duct, the general context adopting the shape of a cylinder or a cylinder ending in an inverted cone trunk.

U.S. Pat. No. 6,717,285

Inventor: Michael Ferraro

Issued: Apr. 6, 2004

A wind powered generating device comprises a tube cluster, a collector assembly, and a turbine assembly. The collector assemblies utilize sails that can be rotated to direct wind down through an inlet tube to a central outlet tube. The central outlet tube is narrowed at a portion, and a turbine is mounted at this narrowed portion to take advantage of the Venturi effect that accelerates the air as it passes the turbine. This permits reliable and efficient operation in areas that were not formerly considered windy enough to be economically feasible for the deployment of wind powered generating devices. Alternative embodiments of the invention include mechanisms for dealing with violent weather conditions, a first of which allows excess wind to bleed off beneath and between the sails, and a second which collapses and covers the sail with a protective sheath/sock.

U.K. Patent Number GB340127

Inventor: Karl Wladimir Branczik

Issued: Dec. 24, 1930

This invention relates to cooling towers, and has for its object to provide improved and cheaper constructions, cheap and simple to erect and covering a minimum amount of ground space. The tower according to the present invention is of venturi form, having a straight line elevation from the ground to the neck. Preferably the wall constituting this part of the tower is made of concrete which may be reinforced and the wall may be of gradually decreasing thickness from the ground to the neck.

U.K. Patent Number GB524680

Inventor: Edgar Honig

Issued: Aug. 13, 1940

A cooling tower comprises an outer shell, of substantially venturi section and an inner shell with supports leaving an annular space open at both ends. The velocity of the ascending moist air is greater in the shell, and expansion takes place at the upper end so that moisture is mainly precipitated in the flared portion of the outer shell. An outer shell is mounted on an annular support on an inner shell, and apertures are provided in the inner shell at the base of the annular space. Apertures may also be provided in the outer shell at the top and at intermediate points.

International Patent Application Number WO01/96740

Inventor: Ernest R. Drucker

Issued: Dec. 20, 2001

A solar energy power plant comprises at least one vertical tower with an open top mounted on a base structure. Each tower has a height of at least 100 meters with a plurality of outwardly projecting heating chambers mounted externally around the lower end of the vertical tower. Each heating chamber is a generally hollow chamber with walls formed of thin metal sheeting for absorbing solar energy, a closeable opening in a lower region of the chamber for introducing ambient air into the chamber and a closeable opening in an upper region of the chamber for releasing heated air accumulated in the chamber into the tower. A constricted zone, e.g. Venturi chamber, within the tower above the heated air inlet openings is adapted to increase the velocity of the heated air moving up the tower, and a wind powered turbine is mounted within the constricted zone and adapted to drive an electrical generating unit. The height of each tower and the number and size of the heating chambers connected thereto are sufficient to provide a substantially continuous updraft in the tower for driving the turbine.

International Patent Application Number
WO2006/018587

Inventor: Alain Coustou

Issued: Feb. 23, 2006

The invention relates to continuously mass-producing electric power with a low cost, without pollution, greenhouse gas emission, consumption of limited natural resources, wastes and independently of irregularity of wind conditions. The invention is embodied in the form of a hollow tower-shaped structure flared at the base thereof, surrounded by a greenhouse area and is optimized in order to combine the four following natural forces and effects: a chimney effect, greenhouse effect, Coriolis force and a Venturi effect. The inventive plant comprises, in particular curved structures for activating an artificial and self-sustaining vertex, peripheral flap shutters for involving a wind quantity and pools optimized for storing calories supplied by sun and optionally by effluents of nuclear power plants, different industrial activities or geothermal waters. The production capacity of the inventive power plant is of several hundreds of MW and the production cost of one KW/hour could be substantially low.

While these energy generating systems may be suitable for the purposes for which they were designed, they would not be as suitable for the purposes of the present invention, as hereinafter described.

SUMMARY OF THE PRESENT INVENTION

A primary object of the present invention is to provide a system for generating electricity utilizing continuous reusable energy.

Another object of the present invention is to provide a system comprising a plurality of towers in communication with a base level conduit housing having a section of smaller diameter with a turbine connected to a power storage system used to power a generator.

Yet another object of the present invention is to provide a system that produces electric power without consumption of limited natural resources, pollution, or greenhouse gas emission, and is independent of wind conditions.

Still yet another object of the present invention is to provide a system that produces electric power at a low cost.

Yet another object of the present invention is to provide a system wherein the towers are unified at the lower end with a single base enclosure providing means to maximize air speed.

Another object of the present invention is to provide a system wherein the venturi throat with the undershot air wheel is affixed within the single base enclosure.

Still yet another object of the present invention is to provide a system wherein the upper end of each tower can include a venturi like collar to increase air suction.

Additional objects of the present invention will appear as the description proceeds.

The present invention overcomes the shortcomings of the prior art by providing low cost electric power without consumption of limited natural resources, pollution, or greenhouse gas emission, and is independent of wind conditions.

Additionally, the system of the present invention includes a venturi-like collar positioned at the top of one or more stacks increasing air flow.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
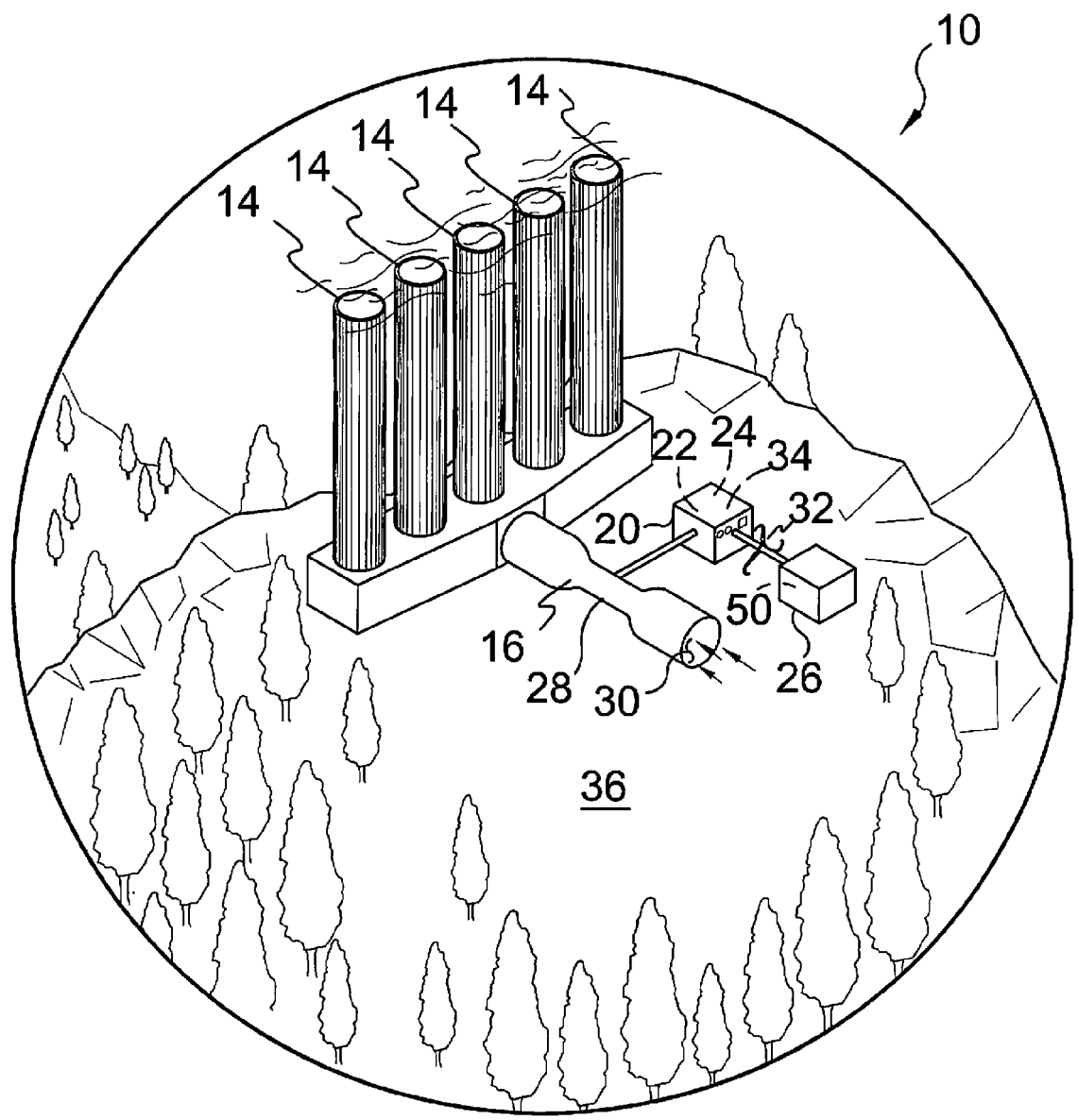
FIG. 1 is an illustrative view of the present invention in use.

Turning now descriptively to the drawings, in which similar reference characters denote similar elements throughout the several views, the figures illustrate the Electric Generating System of the present invention. With regard to the reference numerals used, the following numbering is used throughout the various drawing figures.

10 Electric Generating System of the present invention
12 base
14 tower
16 air intake venture conduit
18 turbine
20 power storage unit
22 air compressor
24 liquid pump
26 generator
28 venturi throat
30 air intake port
32 whirling wheel
34 power storage tank
36 mountain top
38 drive shaft from venturi
40 pressure valve
42 automatic controller
44 pedal member
46 fins of 18
48 venturi-like collar
50 rotor of 26

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 is a system for generating electricity comprising a plurality of towers 14 in communication with a common base with an air intake venturi conduit 16 extending centrally and horizontally therefrom. The air intake venturi 16 with an air intake port 30 leading to a central venturi throat 28 of smaller diameter containing an air driven turbine connected to a power storage unit 20 used to power rotor 50 of generator 26. The power storage unit 20 is comprised of an air compressor 22 or liquid pump 24 in communication with a power storage tank 34. Additionally providing for an optional venturi-like collar positioned at the top of one or more stacks 14. Ideally the present invention 10 is situated at a high altitude such as a mountain top 36 to take advantage of the high winds which are prevalent in such conditions.

Figure 2:
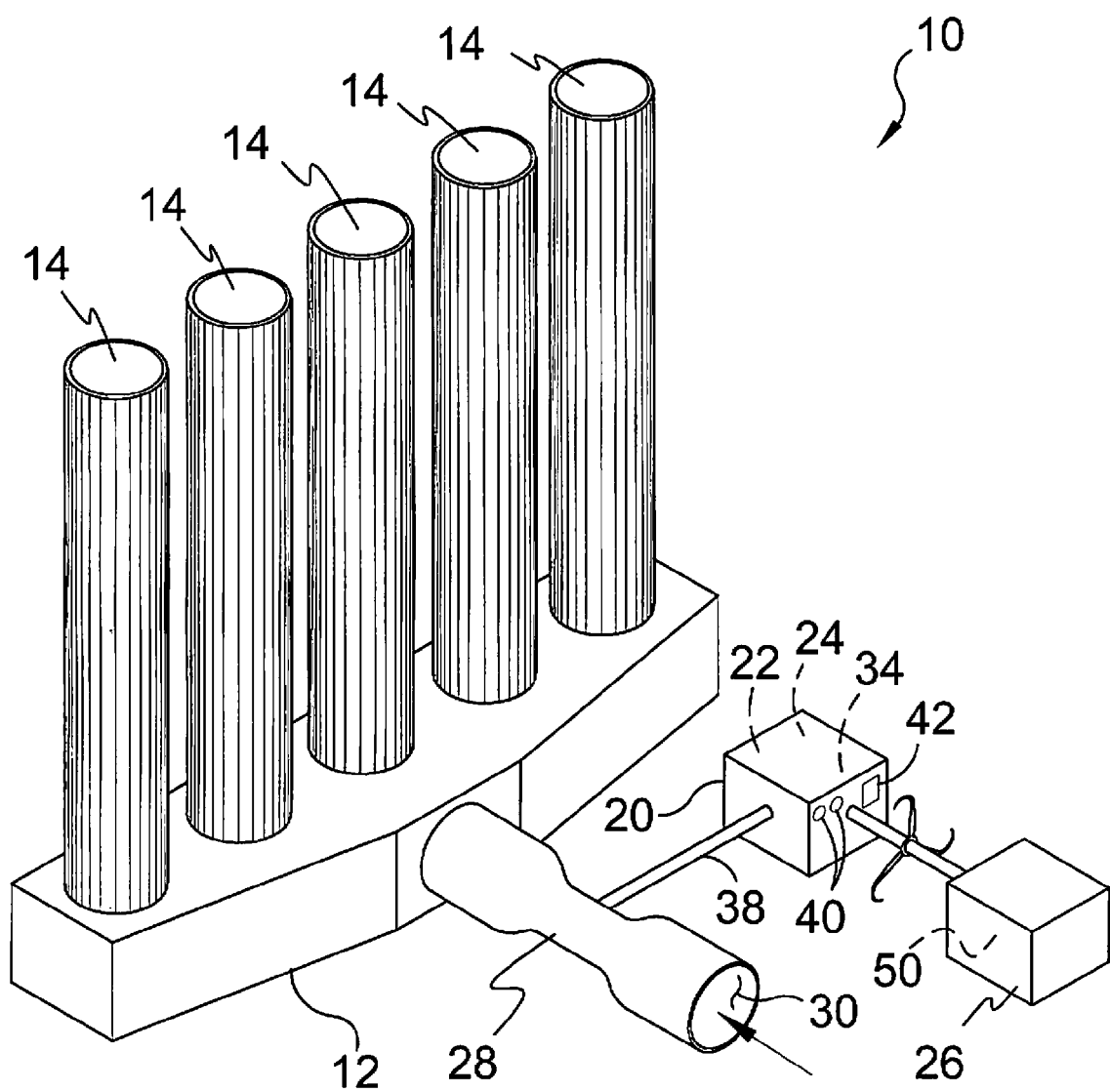
FIG. 2 is a perspective view of the present invention.

FIG. 2 is a perspective view of the present invention 10. The present invention 10 is a system and method for generating power from a controlled air flow wherein air flow above a plurality of towers 14 draws ground air into the base 12 through an air intake port 30 and venturi throat 28, turning a turbine air wheel that has a drive shaft 38 leading to a power storage unit 20 for powering an air compressor 22 or liquid pump 23, power storage tank 34 and generator 26. Pressure valves 40 and an automatic controller 42 provide means to regulate air flow between the store tanks 34 and to the rotor 50 of generator 26.

Figure 3:
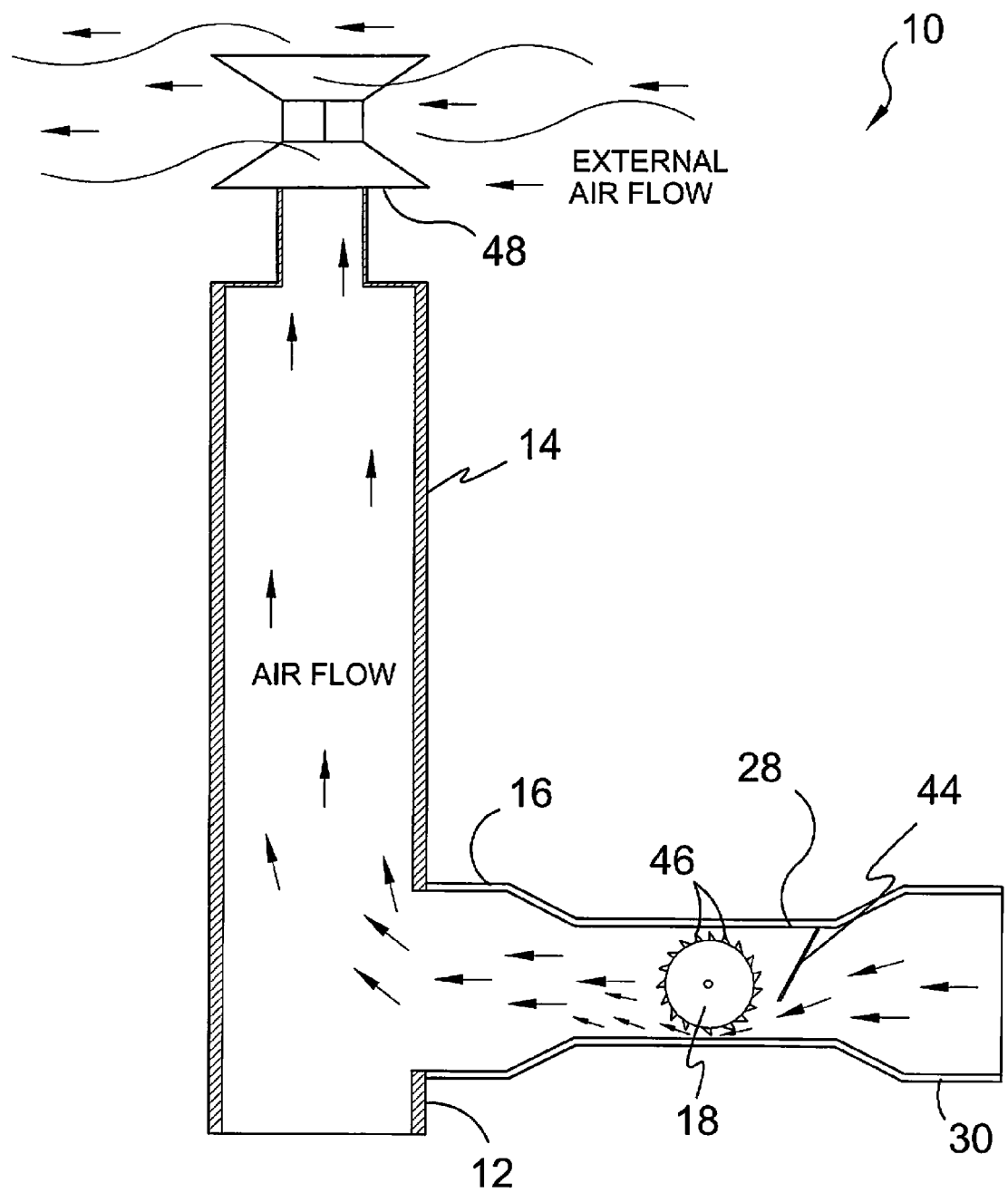
FIG. 3 is a sectional view of the present invention.

FIG. 3 is a sectional view of the present invention 10. Shown is a sectional view of the present invention 10, a system for generating electricity comprising a plurality of towers 14 in communication with a common base 12 having a venturi conduit 16 extending centrally therefrom. A pedal member 44 is disposed in the venturi throat 28 between the air intake port 30 and the turbine wheel 18 and angularly descends from the top of the conduit 16 towards the turbine wheel 18 to deflect air flow to strike the lower fins 46 thereof to effectively rotate the wheel 18. The turbine undershot air wheel 18 is connected to a power storage system used to power a compressor or pump. Also shown is the venturi-like collar 48 positioned at the top of the tower 14.

Figure 4:
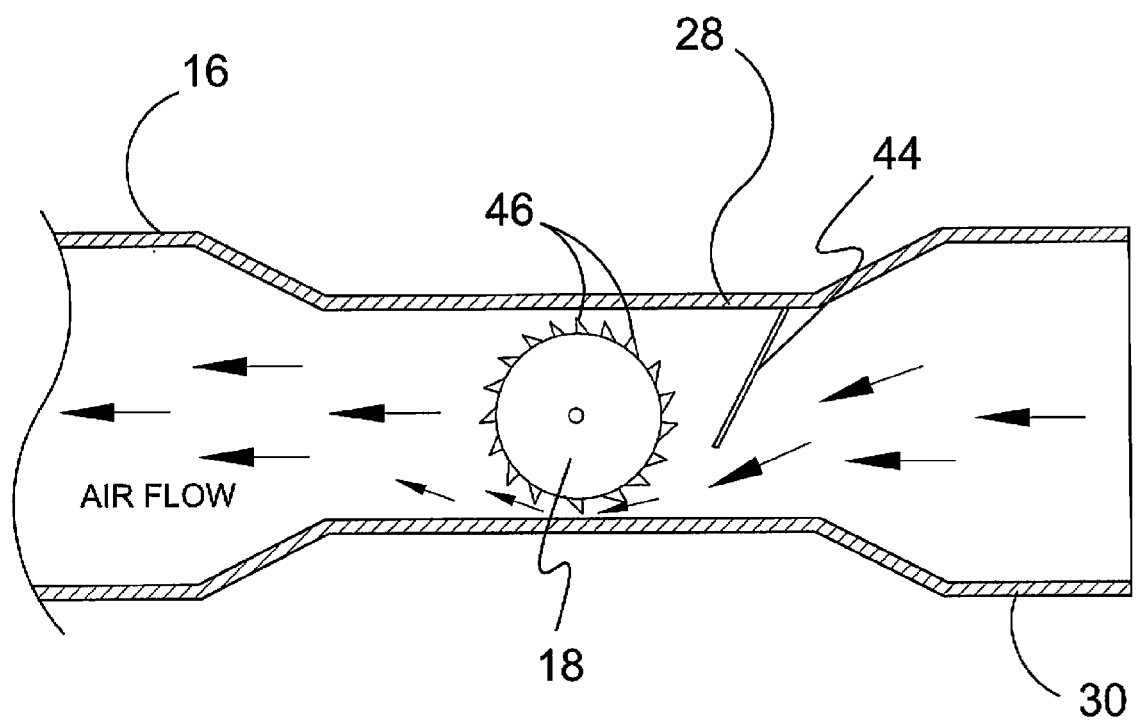
FIG. 4 is a sectional view of the conduit of the present invention.

FIG. 4 is a sectional view of the air intake venturi conduit 16. Shown is a sectional view of the conduit 16 housing having a venturi throat 28 of smaller diameter with an undershot turbine wheel 18 that is driven by the air flow passing through the air intake port 30 and deflected downward by the pedal 44 to drive the fins 46 and rotate the turbine wheel 18.

Figure 5:
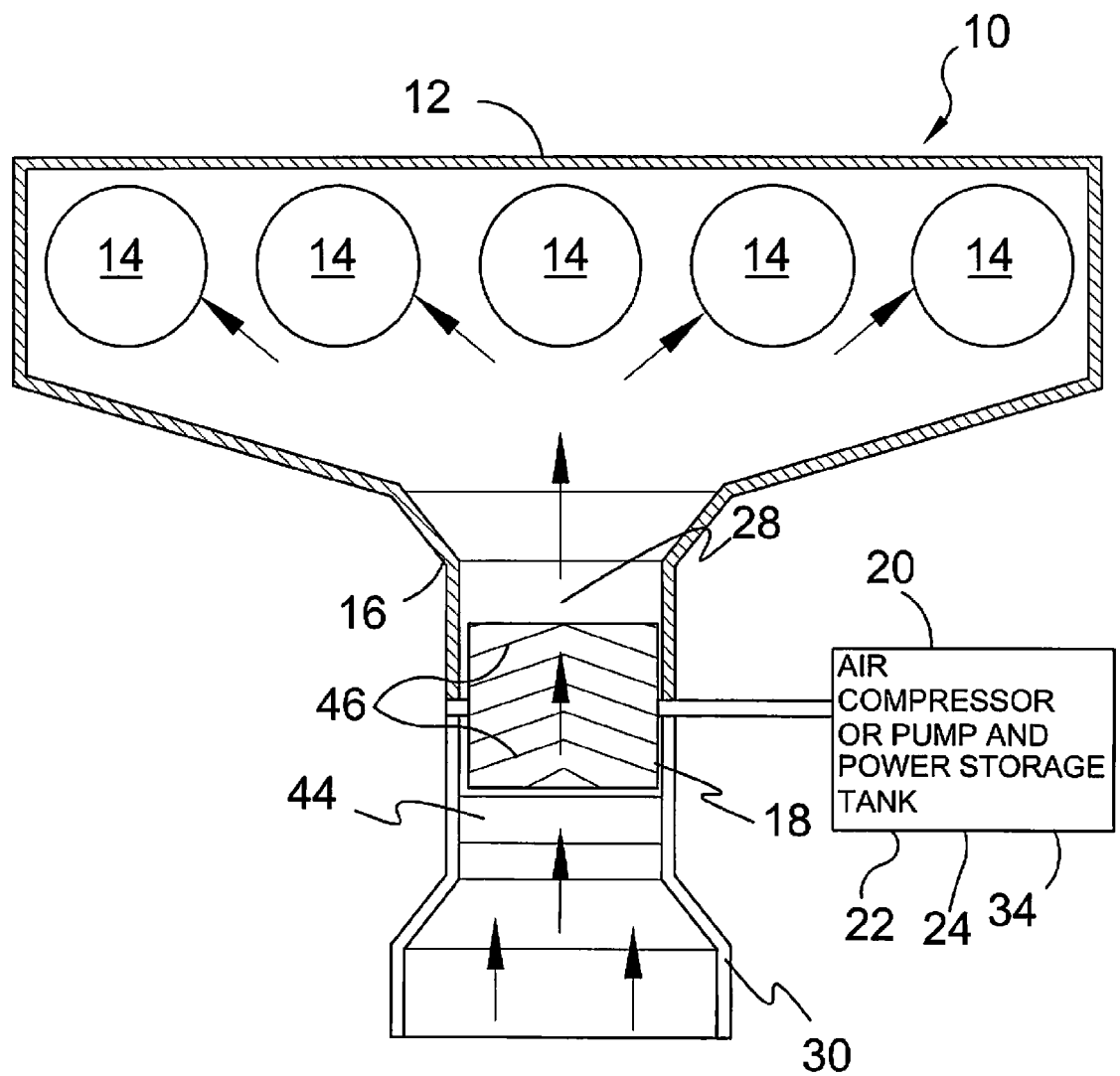
FIG. 5 is a top sectional view of the present invention.

FIG. 5 is a top sectional view of the present invention 10. Shown is a top sectional view of the present invention 10 for generating power from a controlled air flow through air current passing over a plurality of towers 14 that draws ground air through a common base 12 via a single venturi conduit 16 housing an air driven turbine wheel 18 used for powering a generator. The venturi conduit 16 comprises a venturi throat 28 of smaller diameter with an undershot turbine wheel 18 that is driven by the air flow passing through the air intake port 30 and deflected downward by the pedal 44 to drive the fins 46 and rotate the turbine wheel 18. The rotation of the turbine wheel 18 drives a power shaft 38 leading to a power storage unit 20 to energize an air compressor 22 or a liquid pump 24 and store the potential energy derived therefrom in a power storage tank 34. The potential energy is used to power the generator.

Figure 6:
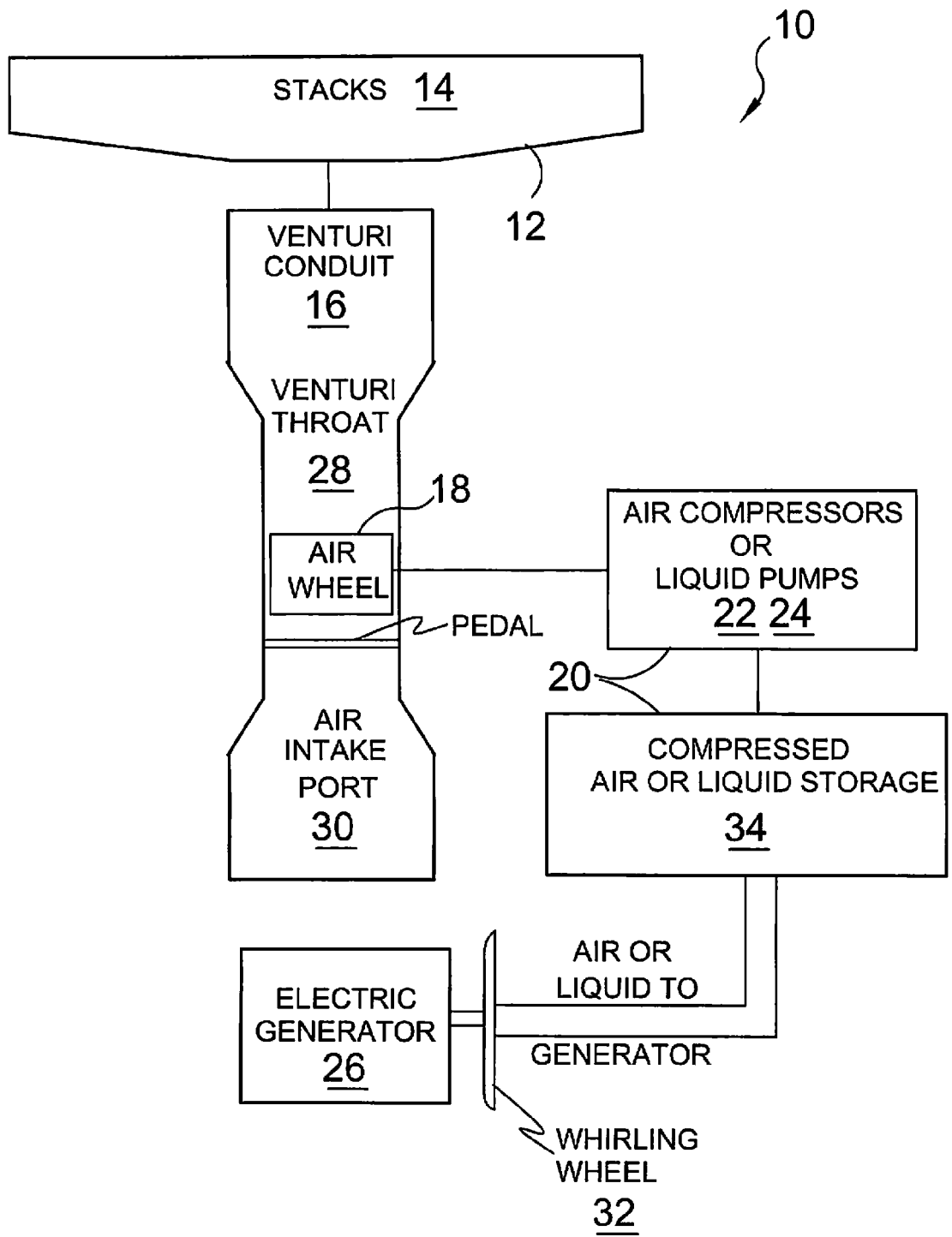
FIG. 6 is a flow chart of the present invention.

FIG. 6 is a flow chart of the present invention 10. The present invention 10 is a system for generating electricity from a controlled air flow through air current passing over a plurality of towers 14 that draws ground air through a common base 12 via a single venturi conduit 16 housing an air driven turbine wheel 18 used for powering a generator 26. The venturi conduit 16 comprises a venturi throat 28 of smaller diameter with an undershot turbine wheel 18 that is driven by the air flow passing through the air intake port 30 and deflected downward by the pedal 44 to drive the fins 46 and rotate the turbine wheel 18. The rotation of the turbine wheel 18 drives a power shaft 38 leading to a power storage unit 20 to energize at least one air compressor 22 or a liquid pump 24 and store the potential energy derived therefrom in at least one power storage tank 34. Compressed air is released from the storage tank 34 and transferred to the generators whirling wheel 32 providing necessary mechanical energy to turn the rotor 50 of the generator 26 and in turn, means to convert the mechanical energy into electrical energy.

Figure 7:
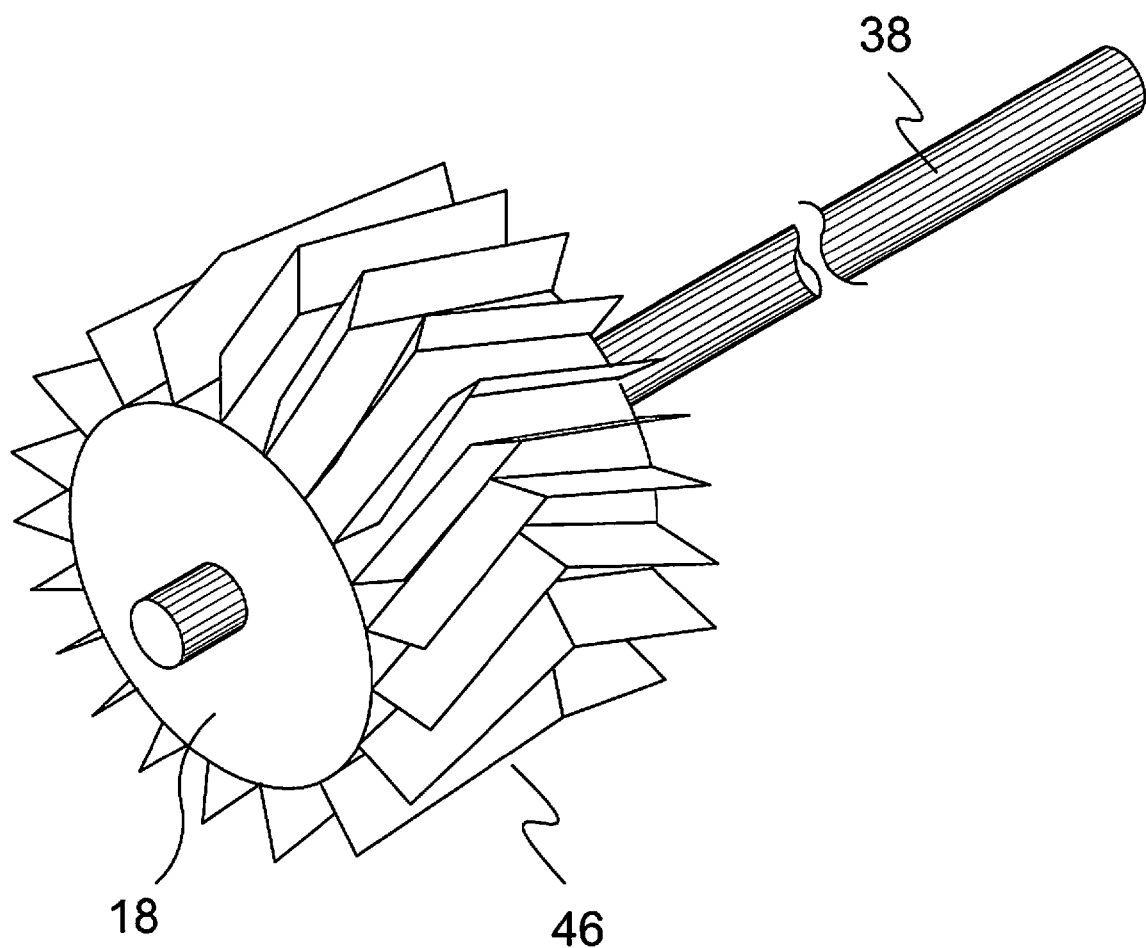
FIG. 7 is a detailed view of the air wheel of the present invention.

FIG. 7 is a perspective view of the air wheel of the present invention. Shown is a detailed view of the turbine wheel 18 of the present invention. Air flow above a plurality of towers draws ground air through a conduit housing with a smaller diameter section containing an air driven turbine wheel 18 with fins 46 for generating energy through a drive shaft 38 to power a generator through a power storage facility.

Figure 8:
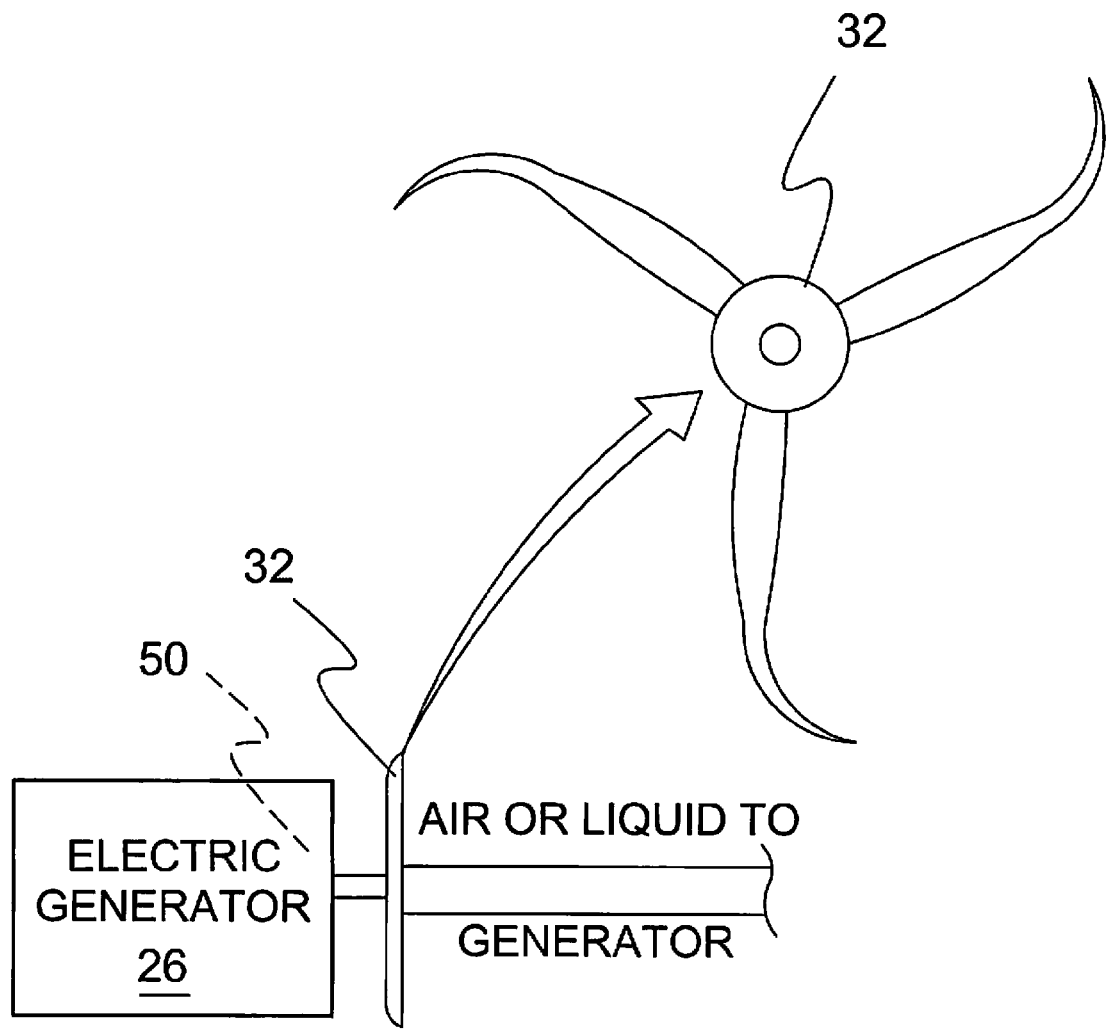
FIG. 8 is a detailed view of the whirling wheel of the present invention.

FIG. 8 is a detailed view of the whirling wheel 32 of the present invention. The present invention is a system for generating electricity comprising a plurality of towers in communication with a base level conduit housing having a centrally disposed section of smaller diameter housing an air driven turbine and an interiorly positioned deflector for deflecting air flow to a desired portion of the air wheel having a drive shaft for powering a generator 26 through a power storage facility.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

The invention claimed is:

1. A system for pressurizing a fluid with continuous reusable energy by utilizing the venturi effect to capture wind power, said system comprising: a) a substantially hollow base structure having opposed end surfaces, a rear surface, a front surface opposite said rear surface, an upper surface joining said rear surface, said front surface having a center section and two side sections joining said center section to said ends, said side sections being longer than said center section, said side sections tapering away from said center section toward said rear surface along a length thereof from said center section to said end surfaces, said end surfaces having a depth between said front surface and said rear surface, the depth of said end surfaces being less than a depth between said center section and said rear surface; b) a plurality of hollow cylindrical vertical towers having a first open end leading into said base and a second open end communicating with the ambient environment; c) an air intake venturi conduit extending horizontally from said base and in interior communication therewith, said conduit having a central venturi throat with a narrower diameter than the opposing ends thereof; d) an undershot turbine wheel disposed within said venturi throat; e) a pressure unit for pressurizing an element and storing the pressurized contents; f) a power shaft communicating between said turbine wheel and a power unit; g) said turbine wheel includes a plurality of fins extending directly from an outer circumferential surface thereof to give the air flow a surface to drive in order to rotate said turbine, said fins having a width across said outer circumferential surface that is greater than a height extending away from said outer circumferential surface; and h) wherein said fins are arranged in chevron fashion with the meeting point of the V pointing away from said air intake port when on the underside of said turbine wheel.

2. The venturi system for pressurizing a fluid with continuous reusable energy recited in claim 1, wherein a pedal member is disposed in said venture throat between said air intake port and said turbine wheel and angularly descends from the top of said conduit towards said turbine wheel to deflect air flow to strike the lower fins thereof to optimize effectiveness in rotating said wheel.

3. The venturi system for pressurizing a fluid with continuous reusable energy recited in claim 2, wherein said power shaft is rotated with said turbine wheel and serves to operate said pressurizing means.

4. The venturi system for pressurizing a fluid with continuous reusable energy recited in claim 3, wherein said pressurizing means is an air compressor.

5. The venturi system for pressurizing a fluid with continuous reusable energy recited in claim 3, wherein said pressurizing means is a water pump.

6. The venturi system for pressurizing a fluid with continuous reusable energy recited in claim 5, wherein said pressurized element is stored in said power storage tank.

7. The venturi system for pressurizing a fluid with continuous reusable energy recited in claim 3, further including a venturi-like collar positioned atop at least one tower.

8. The venturi system for pressurizing a fluid with continuous reusable energy recited in claim 1, wherein said system is disposed at a high altitude.

9. The venturi system for pressurizing a fluid with continuous reusable energy recited in claim 1, wherein said second end is disposed in an area without obstructions to reduce the wind passing thereby.

10. The venturi system for pressurizing a fluid with continuous reusable energy recited in claim 1, wherein said fins have ends at opposite edges of said outer circumferential surface where said ends are further away from said intake than the meeting point of the V when on the underside of said turbine wheel.

11. The venturi system for pressurizing a fluid with continuous reusable energy recited in claim 1, wherein each of said plurality of towers is positioned on said upper surface closer to said rear surface than said front surface.

* * * * *